United States Patent [19]

Lee

[11] 4,414,240

[45] Nov. 8, 1983

[54] PROCESS FOR LOWERING THE THERMOGELATION TEMPERATURE OF EGG ALBUMEN

[75] Inventor: Chang R. Lee, Yonkers, N.Y.

[73] Assignee: Nutrisearch Company, Cincinnati, Ohio

[21] Appl. No.: 290,265

[22] Filed: Aug. 3, 1981

Related U.S. Application Data

[63] Continuation of Ser. No. 95,685, Nov. 19, 1979, abandoned.

[51] Int. Cl.³ .......................... A23B 5/00; A23L 3/00
[52] U.S. Cl. .................................. 426/614; 426/330.1
[58] Field of Search ............................. 426/330.1, 614

[56] References Cited

U.S. PATENT DOCUMENTS

| | | | |
|---|---|---|---|
| 3,520,700 | 7/1970 | Kohl et al. | 426/330.1 |
| 3,682,660 | 8/1972 | Kohl et al. | 426/330.1 |

Primary Examiner—Raymond N. Jones
Assistant Examiner—George C. Yeung
Attorney, Agent, or Firm—Cushman, Darby & Cushman

[57] ABSTRACT

The thermogelation temperature of egg albumen can be decreased by cooling an alkaline solution of egg albumen heated to a temperature within the range of from about 60° C. and the gelation temperature of the egg albumen, the solution having a pH within the range of from about 8 and about 10 and an egg albumen content in said solution of less than about 20%, to a temperature sufficient to arrest further modification of the protein.

6 Claims, No Drawings

PROCESS FOR LOWERING THE THERMOGELATION TEMPERATURE OF EGG ALBUMEN

This is a continuation of application Ser. No. 95,685 filed Nov. 19, 1979, now abandoned.

BACKGROUND OF THE INVENTION

The present invention relates to a process for lowering the thermogelation temperature of egg albumen below that of natural egg albumen and the product so produced.

DESCRIPTION OF THE PRIOR ART

Egg albumen is unique in the area of natural proteins becaue of its ability to form a stable gel at a relatively low temperature and also to have the desirable characteristics of whipping. These desirable characteristics have presented problems in the area of pasteurization. Because of the desirability to maintain both functions of the egg albumen, pasteurization temperatures have generally been extremely low in order to avoid degrading or coagulating the protein. It is well known to pasteurize egg albumen by heating the egg albumen at pH 9 to 56.7° C. for 3.5 minutes (Food Products Development, 4(3), p. 28 at page 32). Stabilized liquid egg albumen can be pasteurized at pH 7 by the addition of a stabilizing compound such as aluminum sulfate. In the presence of hydrogen peroxide, plain liquid egg white can be pasteurized at 51.6° C. for two minutes without incurring any coagulation problem. These methods are also discussed in Food Products Development, ibid. Also of relevance to the area of pasteurization is "Recent Developments In The Egg Industry" by O. J. Kahlenberg, The Baker's Digest, October 1967 at page 100 as well as U.S. Pat. No. 3,520,700.

Most of these processes have been restricted because of the desire to maintain both whippability and a thermogelation temperature equivalent to that of fresh egg albumen.

It has now been found that the thermogelation temperature of fresh egg albumen can be decreased without causing coagulation of the egg albumen to thereby render the egg albumen even more useful in that capacity.

THE INVENTION

In accordance with the present invention, it has been found that the thermogelation temperature of egg albumen can be decreased by cooling an alkaline solution of egg albumen heated to a temperature within the range of from about 60° C. to the gelation temperature of the egg albumen, the solution having a pH within the range of from about 8 and about 10 and an egg albumen content in said solution of less than about 20%, to a temperature sufficient to arrest further modification of the protein. This process can be conducted in the absence of any compounds which stabilize the protein and is conducted preferably on a pure egg albumen solution.

The egg albumen as used in the process of the present invention can be either fresh or reconstituted dried albumen. The fresh albumen should be treated to make sure the viscosity of the material is essentially uniform. The dried egg albumen is usually processed, pasteurized and dried in accordance with known prior art techniques and resolubilized in water. The insoluble portion of protein should be kept at a minimum since the process of the present invention cannot affect that material. Since excessive drying temperatures can decrease the solubility of the protein, particular attention should be directed to using a dried egg albumen which has not been processed under extreme conditions to avoid large amounts of insoluble material.

The egg albumen solution to be treated in accordance with the process of the present invention does not require a minimum amount of protein for effective treatment. Natural liquid egg white has a protein content of approximately 11% and a total solids content of approximately 12.4%. It is preferred not to use an egg albumen solution having more than 20% protein since the conditions of reaction tend to gel the solutions at higher protein concentrations. Preferably, the protein concentration is less than about 15% protein. The percentage of protein in the solution is intended to cover those proteins in solution and not all proteins both soluble and insoluble.

As used herein, the percent protein is based on total Kjeldahl nitrogen. The percentage protein of the solutions treated is by weight of the proteins in solution based on the total weight of the solution.

The protein-containing solution for processing in accordance with the present invention can be obtained by using raw egg albumen or by dissolving dried egg albumen in water. Raw egg albumen can also be diluted in water to lower the protein content though this is less preferred. Sufficient agitation in this portion of the process as well as the remainder of the process is preferred to avoid gelation due to the static positioning of the reactive sites on the protein. Care should be taken to avoid excessive foaming during agitation. Agitation equipment presently used for normal egg processing can be used.

Subsequently, the pH of the egg albumen solution is adjusted to an alkaline range of from about 8 to about 10 and preferably from about pH 9 to about pH 10. Most effective results have been achieved at about pH 9.5.

Native egg albumen can be processed directly since the native pH is about 8.9. Preferably, the pH is adjusted to within the range of pH 9 to about pH-10 and more preferably about pH 9.5. The solutions prepared from dried egg albumen generally have a pH within the range of 7 to 8 and thus require the addition of alkali to increase their pH to within the range of from about 9 to about 10.

Any food grade alkalizing agent which does not interfere with the final reaction product and/or its use can be used in adjusting the pH. Preferably sodium and potassium hydroxide or more preferably sodium hydroxide is used. Calcium hydroxide while being an effective alkalizing agent, is less preferred since calcium can cause protein cross-linking and, therefore, insolubilization. Other methods of elevating the pH can be used, such as passing the protein solution through an anionic cationic exchange resin.

The alkalizing agent is added under conditions which will not cause localized pH elevations above about pH 10 to thereby avoid extensive protein denaturation. For instance, a weak (1 normal) sodium hydroxide solution can be added fairly rapidly under fast stirring without fear of a strong concentration of alkali buildup in any one area. The use of a stronger alkaline solution is desired at times to avoid the necessity of removing excess water at the conclusion of the process when drying the product. In such a case, a stronger solution of alkali such as a 4 normal solution of sodium hydroxide can be added, but it must be added slowly and with rapid stirring. The conditions of addition can vary depending upon the strength of the alkalizing agent, the degree of stirring and the rate of addition. These factors would be obvious to one skilled in the art. The alkaline egg albumen solution is then heated to a temperature within the range of from about 60° C. and the thermogelation temperature of the egg albumen. An upper limit of about 80° C. can be used through the upper limit of 75° C. is preferred. The temperature should be elevated as fast as possible without causing protein insolubilization by excessive heat denaturation since long time heating is harmful in controlling the unfolding of the protein molecules. The maximum heating time is the gelation point of the protein. The heating time should not be over a maximum of about 1 minute depending on the temperature processing. The heating time is defined as that time in which the egg albumen is heated above 55° C. and includes heat up and cool down times. Heating can be accomplished in a vessel with a heating means or other equivalent. High temperature short time pasteurization processing equipment can be effectively utilized. In the latter case, the temperature is elevated very rapidly, i.e., within 20 seconds without causing harm to the protein and this method is most preferred. The alkali can be added to the heated solution or the alkalization and heating can be conducted simultaneously.

After the alkalized egg albumen solution has reached a maximum temperature level, cooling is immediately (within less than 30 seconds) applied to reduce the temperature of the solution to a level below which further change in the protein structure does not occur (below at least about 55° C.) and preferably to room temperature. Adequate agitation is necessary to insure that cooling is uniform throughout the mass. The cooling rate and temperature are relative to the heating rate and temperature as well as the activation point of the protein so that the cooling can retard further modification of the protein. Therefore, cooling must be initiated within less than about 30 seconds after the temperature has reached the maximum desired processing temperature. The change in the protein structure by heat is halted or significantly retarded at the lower temperatures. The temperatures should not be reduced below a temperature which will damage the protein or reduce the effects obtained by heating and preferably not below about 2° C. In one embodiment the cooling is conducted at a rate sufficient to lower the temperature to the range of from about 2° C. to about 30° C. within about 15 minutes after initiating the cooling operation. At low temperatures, renaturation or folding of the protein is favored. The cooling is conducted as rapidly as convenient but at such a rate sufficient to prevent gelation of the solution.

Subsequent to cooling, the pH is adjusted to the range of from about 6 to about 8 and preferably from about 6.5 to about 7.5 with any food grade acid. Strong acids can be used under fast stirring with slow addition and weaker acids can be used with less strenuous conditions as long as the conditions are such as not to cause a localized acid buildup. The use of a strong acid is favored in those conditions where the product is dried since there is less water to be removed. The strength of the acid and its rate of addition are dependent on avoiding localized depressions in pH which may affect the protein.

Since the cooling step is conducted with rapid stirring, it is possible to adjust the pH during the cooling step. Acid addition can be initiated at the same time that the cooling is initiated or towards the end of the cooling period.

The neutralization step is important in preparing a dried product for general use. A partially alkaline product can also be prepared by not reducing the pH to a neutrality prior to drying. Similarly, if a partially acidic product is desired, additional acid can be added to reduce the pH level desired.

The neutralized product can be used as is, concentrated and/or dried. If the liquid product is utilized, refrigeration must be maintained to avoid spoilage. Concentration or drying should be conducted under conditions which will not further substantially denature the product. Processes which affect localized high heating of the product are to be avoided since the protein as treated has a lower coagulation temperature. Preferably, the product is concentrated by mechanical means such as gel filtration or ultrafiltration or by the use of freeze drying, vacuum or spray drying. The preferred method of drying is spray drying.

For hygenic purposes, the egg solution can be pasteurized for treatment during treatment or after treatment as desired. If pasteurization is conducted before treatment, sterile ingredients and sterile conditions would be maintained to insure against contamination.

While it is well known to pasteurize egg whites by heating egg white at pH 9 to 56.7° C. for 3.5 minutes (Food Product Development, 4 (3), p. 28 at page 32), it is critical to control the temperature and the heating time for effective bacteria kill. The temperature of pasteurization has been found to be low. Stabilizers such as aluminum sulfate are added to increase the heating temperature which can be used before gelation. The use of whey protein concentrate in combination with the modified egg albumen may contribute stability to the albumen allowing for the use of a higher pasteurization temperature. Heat processing temperatures in the range of 70°–75° C. for short times can be used without gelling the egg albumen.

In the product of the invention, at least 50% and more preferably at least 75% and most preferably 100% of the protein is modified egg albumen. The remaining protein can comprise blends of other unmodified proteins. Such other unmodified proteins which can be added to the processed protein before (including reslurrying) or after drying (dry blend) include unmodified whey proteins including dry whey, delactosed whey, delactosed/demineralized whey where demineralization is accomplished by any known method transfer (ultrafiltration, reverse osmosis), the dried permeate and dried delactosed permeate resulting from the ultrafiltration of whey, the precipitate prepared by neutralizing acid whey as is disclosed in U.S. Pat. No. 4,036,999, and the precipitate prepared by adding calcium ion to sweet whey followed by neutralization as disclosed in U.S. Pat. Nos. 3,560,219 and 4,036,999 are preferred, the disclosures of which are incorporated herein by reference.

Also included are other dairy proteins such as casein and the alkali metal caseinate, egg albumen, vegetable proteins such as soy proteins, blood proteins, and the like. These blends can be prepared by dry blending or codrying a liquid blend. Only a small amount of additional non-modified protein (less than 25%) is recommended to avoid diluting the effects of the modified proteins.

While the product can be dried effectively by itself, it is also contemplated within the scope of the present invention to co-dry the product with drying agents or other functional ingredients. For example, the product of the present invention can be co-dried with milk solids, egg yolks, or replacers or blends thereof along with gums, starch, sugars, proteins including casein and soy, stabilizers, flavorings, bulking agents, emulsifiers and the like materials.

The products of the present invention are characterized by providing solutions having reduced thermogelation temperatures at a pH between about 3 and about 10. The products of the present invention can be used as replacements for all or part of egg albumen in either the native or dried forms in various food and other products.

Since thermogelation basically occurs wherein protein molecules heated to an activation temperature are in close proximity to cause interaction, the thermogelation temperature is related to the protein content of the solution. The higher the protein content, the lower the gelation temperature and generally the higher the gel strength. If, for example, an egg albumen solution of 8% protein (10% total solids) modified in accordance with the present invention gelled at 75° C. provides a gel strength of about 140 grams, a 9.6% solution of protein (12% total solids) of the same protein gelled at the same temperature provides a gel strength of 180 grams. At lower gelation temperatures, a decrease of 5° C. in gelation temperature can be obtained by modification at constant protein level. At higher gelation temperatures at the same protein level, a difference of 10° C. is obtained by modification at constant protein level for the same or similar gel strength. Therefore, it is preferred to utilize solutions containing from about 10% to about 12%, preferably about 11.5% protein in preparing gelled materials.

The present invention is more fully illustrated in the Examples which follow.

EXAMPLE 1

A commercially obtained dried egg albumen was dissolved in an aqueous solution to provide approximately 10% total solids in solution at room temperature. The pH of the solution was about 7. The pH was adjusted to about pH 9.5 by the slow addition of sodium hydroxide with rapid stirring. The alkaline egg albumen solution was heated to 65° C. and immediately rapidly cooled to below about 50° C. After reaching room temperature, the pH of the solution was adjusted to about 7 by the slow addition of hydrochloric acid.

The product of Example 1 was tested for gelation properties and the results were compared to the gelation results obtained using an egg albumen control. The egg white control solution was prepared from the same commercially prepared dried egg white. Both solutions had a total solids content of 10%. The pH of each solution was adjusted to 7. 35 grams of solution is weighed into a 35 cm.×45 cm. diameter glass dish. The dish is covered with a plastic film and a watch glass. The glass dish is lowered into a hot water bath for 30 minutes from the time the dish is placed into the bath. After the 30 minutes heating period, the dish is placed in a refrigerator and held overnight. The gel strength is determined by allowing the temperature of the gel to reach room temperature (25° C., a water bath can be used for this purpose) and then inverting the gel on the scale of a Marine Colloids Gel Tester (slow speed and small plunger). The amount of force in grams required to break the center of the gel is then determined. Texture was determined visually. The following results were obtained:

TABLE I

| SAMPLE | PRODUCT EXAMPLE 1 | | UNTREATED CONTROL | |
|---|---|---|---|---|
| Gel test temperature °C. | Gel strength grams | Texture | Gel strength grams | Texture |
| 65 | 30 | Very weak gel | * | Pourable gel |
| 70 | 50 | Weak | * | Non-pourable gel |
| 75 | 140 | Weak, good gel | 50 | Weak |
| 80 | 240 | Very good gel | 110 | Weak, good gel |
| 85 | 280 | Excellent gel | 130 | Weak, good gel |

*Not measurable

As it can be seen from the preceding data, even at a low protein level of 8% from 10% total solids, the untreated dried egg albumen solution consistently provided weaker gels than the modified egg albumen. For comparable results, the untreated egg albumen containing solutions had to be heated at least 10 degrees higher than the treated albumen containing solution. Since gel strength is related to concentration, the use of the low protein concentration gives a clear picture of the results to be obtained since gelation is favored by high protein content.

The process of Example 1 was repeated using 12% total solids (9.6% protein). The following results were obtained:

TABLE II

| SAMPLE | PRODUCT EXAMPLE 1 | | UNTREATED CONTROL | |
|---|---|---|---|---|
| Gel test temperature °C. | Gel strength grams | Texture | Gel strength grams | Texture |
| 65 | 40 | Very weak gel | * | Pourable gel |
| 70 | 70 | Weak gel | 20 | Weak gel |
| 75 | 180 | Weak gel | 120 | Weak gel |
| 80 | 310 | Very good gel | 180 | Very good gel |
| 85 | 380 | Very good gel | 230 | Very good gel |

*Not measurable

The data at 12% total solids show the same trend as the data at 10% total solids. The onset of gelation and the strength of the gels are improved at higher protein content.

What is claimed is:

1. A process for producing egg albumen having improved thermogelation properties consisting essentially
   (1) heating an alkaline egg albumen solution to a temperature ranging from about 60° C. to the thermogelation temperature of the egg albumen, said solution having a pH ranging from about 8 to about 10 and a content of protein soluble within said pH range of less than about 20 percent,
   (2) cooling the resulting heated solution to a temperature below at least 55° C. but not below 2° C. at a rate sufficient to avoid gelation of said solution and with sufficient agitation to insure uniform cooling throughout said solution, said cooling being initiated within less than 30 seconds after said solution has been heated to the temperature recited in step (1), said solution during heating step (1) and cooling step (2) not being at a temperature greater than 55° C. for a period of time greater than 1 minute, and (3) adjusting the pH of the solution to about 6 to about 8 simultaneously with or subsequent to cooling in step (2).

2. The process of claim 1 wherein the pH of the solution being heated in step (1) ranges from about 9 to about 10.

3. The process of claim 1 wherein the pH of the solution is adjusted to about 6.5 to about 7.5 simultaneously with or subsequent to the cooling operation of step (2).

4. The process of claim 1 wherein the alkaline egg albumen solution is heated in step (1) to a temperature ranging from about 60° C. to about 80° C.

5. The process of claim 1 wherein the heated alkaline solution is cooled in step (2) within about 15 minutes after said cooling has been initiated to a temperature ranging from about 30° C. to about 2° C.

6. The process of claim 1 wherein said solution is heated in step (1) to said temperature within about 20 seconds.

* * * * *